(12) United States Patent
Billich

(10) Patent No.: US 11,716,919 B2
(45) Date of Patent: Aug. 8, 2023

(54) METHOD FOR ORIENTING AN IMPLEMENT ATTACHED TO A THREE-POINT HITCH

(71) Applicant: Deere & Company, Moline, IL (US)

(72) Inventor: Manuel Billich, Dischingen (DE)

(73) Assignee: DEERE & COMPANY, Moline, IL (US)

( * ) Notice: Subject to any disclaimer, the term of this patent is extended or adjusted under 35 U.S.C. 154(b) by 494 days.

(21) Appl. No.: 16/047,369

(22) Filed: Jul. 27, 2018

(65) Prior Publication Data

US 2019/0029164 A1 Jan. 31, 2019

(30) Foreign Application Priority Data

Jul. 27, 2017 (DE) .......................... 102017212951.4

(51) Int. Cl.
| | | |
|---|---|---|
| *A01B 63/00* | (2006.01) | |
| *A01B 59/06* | (2006.01) | |
| *A01B 63/111* | (2006.01) | |
| *A01B 63/10* | (2006.01) | |

(52) U.S. Cl.
CPC .......... *A01B 63/008* (2013.01); *A01B 59/066* (2013.01); *A01B 59/068* (2013.01); *A01B 63/10* (2013.01); *A01B 63/1117* (2013.01)

(58) Field of Classification Search
CPC ... A01B 63/008; A01B 63/10; A01B 63/1117; A01B 59/066
USPC ....................................................... 172/1, 4
See application file for complete search history.

(56) References Cited

U.S. PATENT DOCUMENTS

| | | | | |
|---|---|---|---|---|
| 2,648,997 A | * | 8/1953 | Sawyer ................ | A01B 59/004 74/586 |
| 2,887,166 A | * | 5/1959 | Vogelaar .............. | A01B 63/114 172/9 |
| 2,971,589 A | * | 2/1961 | DuShane ............ | A01B 63/1117 172/239 |
| 3,029,880 A | * | 4/1962 | Heberlein ............ | A01B 59/068 172/272 |
| 3,269,464 A | * | 8/1966 | Smelcer .............. | A01B 63/1117 172/10 |

(Continued)

FOREIGN PATENT DOCUMENTS

| | | | | |
|---|---|---|---|---|
| CN | 106171086 A | | 12/2016 | |
| DE | 19829782 A1 | * | 1/2000 | ........... A01C 17/006 |

(Continued)

OTHER PUBLICATIONS

Tractor Mike, "Hooking up a Three Point Implement," dated Feb. 4, 2013, YouTube, <https://www.youtube.com/watch?v=bSatF4Qoqml> (Year: 2013).*

(Continued)

*Primary Examiner* — Thomas B Will
*Assistant Examiner* — Joel F. Mitchell

(57) ABSTRACT

A method for adjusting an orientation angle of an agricultural implement includes arranging a hitch such that an upper link and at least one lower link is articulated to a support structure of the utility vehicle, and adjusting the orientation angle based on a target length of the upper link. The target length of the upper link is determined as a function of the orientation angle and as a function of a lower link angle.

11 Claims, 1 Drawing Sheet

(56) References Cited

U.S. PATENT DOCUMENTS

| | | | | |
|---|---|---|---|---|
| 3,539,113 | A * | 11/1970 | Tyler | A01C 17/001 239/673 |
| 3,572,763 | A * | 3/1971 | Cannon et al. | A01B 59/004 172/272 |
| 4,362,272 | A * | 12/1982 | Martin | A01C 3/063 198/664 |
| 4,508,178 | A * | 4/1985 | Cowell et al. | A01B 63/114 172/239 |
| 4,825,956 | A * | 5/1989 | Kanato et al. | A01B 59/043 172/2 |
| 5,501,404 | A * | 3/1996 | Meyer et al. | A01C 3/066 111/11 |
| 5,579,850 | A * | 12/1996 | Kimura et al. | A01B 63/1117 172/4 |
| 6,119,786 | A * | 9/2000 | Creger et al. | A01B 63/1115 172/7 |
| 6,378,620 | B1 * | 4/2002 | Luca et al. | A01B 63/112 172/4 |
| 6,749,035 | B2 * | 6/2004 | Bundy | E02F 9/2257 180/41 |
| 6,830,110 | B2 * | 12/2004 | Schlesser et al. | A01B 63/1006 172/8 |
| 7,588,089 | B2 * | 9/2009 | Guo et al. | A01B 59/069 172/465 |
| 9,980,422 | B2 * | 5/2018 | Czapka et al. | A01B 63/14 |
| 2017/0290258 | A1 * | 10/2017 | Mollick | A01B 59/002 |
| 2017/0315006 | A1 * | 11/2017 | Meid et al. | A01B 63/10 |
| 2018/0116096 | A1 * | 5/2018 | Gresch et al. | G01L 5/16 |

FOREIGN PATENT DOCUMENTS

| | | |
|---|---|---|
| DE | 10011499 A1 | 9/2001 |
| DE | 10140383 A1 | 3/2003 |
| DE | 10350651 B3 | 5/2005 |
| DE | 102015221120 A1 | 5/2016 |
| DE | 102016209270 A1 | 11/2017 |
| DE | 102016223189 A1 | 4/2018 |
| EP | 1252806 A2 | 10/2002 |
| EP | 2918157 A2 | 9/2015 |
| EP | 3289847 A1 | 3/2018 |
| EP | 3311639 A1 | 4/2018 |
| GB | 2187375 A | 9/1987 |
| WO | 2016192973 A1 | 12/2016 |

OTHER PUBLICATIONS

German Search Report issued in counterpart application No. 102017212951.4 dated Apr. 30, 2018 (10 pages).

European Search Report issued in counterpart application No. 18184962.1 dated Nov. 9, 2018 (25 pages).

* cited by examiner

METHOD FOR ORIENTING AN IMPLEMENT ATTACHED TO A THREE-POINT HITCH

RELATED APPLICATIONS

This application claims priority to German Application No. 102017212951.4, titled "Method for Orienting an Implement Attached to a Three-Point Hitch," filed Jul. 27, 2017, which is hereby incorporated by reference in its entirety.

FIELD OF THE DISCLOSURE

The present disclosure relates generally to a method for orienting an implement attached to a three-point hitch on an agricultural utility vehicle.

BACKGROUND OF THE DISCLOSURE

In agricultural applications, attachment of implements to an agricultural vehicle such as a utility vehicle can be time consuming and challenging. For example, an exact orientation of the implement may be difficult to achieve, thereby affecting the working properties of the implement. Therefore, to address such concerns, there is a need in the art for a robust hitch assembly that is capable of achieving an orientation for an attached implement in a simple manner.

SUMMARY OF THE DISCLOSURE

According to one aspect of the present disclosure, a method is provided for adjusting an orientation angle of an agricultural implement attached by a hitch to an agricultural utility vehicle. The hitch may comprise an upper link articulated to a support structure of a utility vehicle and at least one lower link, but typically two lower links, articulated to the support structure of the utility vehicle. The upper link may be coupled to an articulation point of the support structure and to a coupling point of the agricultural implement, while the lower link may be coupled to an additional articulation point of the support structure and an additional coupling point of the agricultural implement. The orientation angle of the agricultural implement is adjusted by a target length of the upper link. The target length of the upper link is determined as a function of the orientation angle and as a function of a lower link angle, the lower link angle being enclosed by the lower link and a vehicle horizontal line.

By using this method, a desired orientation angle of the agricultural implement may be specified by a user and automatically adjusted by achieving a corresponding target length of the upper link. Since the lower link angle, and thus the working height of the agricultural implement, is taken into consideration in this method, the adjusted orientation angle may be kept constant, even for changing or different working heights, by determining an adjusted target length of the upper link. This determined adjusted target length may be automatically adjusted or may be signaled to the user for manual adjustment.

In other embodiments, the orientation angle of an agricultural implement attached to the front or rear hitch may be additionally adapted to take into account an angle of inclination of the utility vehicle relative to the earth horizontal line, which, may be advantageous with implements for carrying liquids in open containers, for example. If deviations occur between the current angle of inclination of the utility vehicle and a target angle of inclination to be maintained for the relevant agricultural implement, this may be compensated by appropriate correction of the target inclination angle of the agricultural implement. For this, depending on the direction of the slope, there is an increase or reduction of the target orientation angle corresponding to the difference between the target angle of inclination and the current angle of inclination. The current angle of inclination is detected, for example, by an inclination sensor assigned to the utility vehicle.

It should be noted that creation of a target orientation angle in this way relieves the user or vehicle driver during handling of the agricultural implement, because conventional time-intensive manual activities such as descending from the tractor and visually inspecting the agricultural implement are not necessary for exact orientation of the agricultural implement. In addition, a variety of c measuring devices (e.g. a spirit level) for adjusting a desired orientation angle may be utilized.

The method makes it possible for the user to specify a orientation angle for the agricultural implement and adjust it by a target length of the upper link, wherein the target length is determined as a function of the target angle of inclination and the lower link angle. By orienting the agricultural implement in accordance with the above embodiments, the working properties (e.g. spreading properties for a manure spreader) may be improved.

In certain embodiments, the lower link angle may be determined by a sensing system or a sensor. In other embodiments, the lower link angle may be directly detected metrologically by an angle sensor or some other suitable sensor, for example.

In other alternative embodiments, a lift arm angle may be detected metrologically (e.g., by a suitable sensor), and may be available as information during operation of the rear hitch. The lower link angle may then be determined indirectly and as a function of the detected lift arm angle with little computational effort. The lift arm angle may be enclosed by a lift arm and the vehicle horizontal line, wherein the lift arm, as a component of the rear hitch, has an articulated connection to the support structure of the utility vehicle and has an articulated connection via a lifting element (e.g. an adjustable lifting spindle) to the lower link.

The target length of the upper link may be determined as a function of a mast height of the agricultural implement and/or a length of the lower link, wherein the length of the lower link may be defined as a distance between the articulation point thereof on the support structure of the utility vehicle and the coupling point on the agricultural implement. This data or information may be provided exactly and in a technically simple manner, because the mast height and the length of the lower link are unambiguously defined geometrically.

The target length of the upper link is preferably determined as a function of at least one of the following features: a coordinate of the articulation point of the lower link relative to a zero point of a defined coordinate system on the utility vehicle, or a coordinate of the articulation point of the upper link relative to a zero point of a defined coordinate system on the utility vehicle.

For example, a coordinate system may be used which is already provided for a conventional determination of coordinates on the utility vehicle. In this coordinate system, for example, an x-axis may be oriented parallel to a longitudinal direction (parallel to the travel direction) or a vehicle horizontal line of the utility vehicle and a y-axis may be oriented parallel to a vertical direction or a vehicle vertical line of the vehicle, the x-axis and the y-axis intersecting in a zero point of the coordinate system. In this way for example, an x-coordinate and/or a y-coordinate of the above-mentioned articulation points may be easily determined mathematically and used for determining or calculating the target length of the upper link.

In certain embodiments, the target orientation angle may be enclosed by the vehicle horizontal line and a reference line of the agricultural implement. For example, the reference line may be an imaginary extension of a mast height of the agricultural implement. In other words, this reference line—viewed in a transverse direction perpendicular to the longitudinal direction and perpendicular to the vertical direction of the utility vehicle—may be formed by a connecting line between the coupling points of the upper link and a lower link on the agricultural implement.

The target length of the upper link is preferably adjusted by an actuator, so that the target length may be automatically adapted at any time. This relates to a hydraulic upper link, the length of which may be modified by a hydraulic controller. The adjustment of the target length of the upper link is preferably supported by a length sensor system in or on the upper link.

In the case of a mechanical upper link, the determination of the target length of the upper link may be used as an assistance system in order to indicate to a user the necessary target length, which may then be manually adjusted by the user.

Other features and aspects will become apparent by consideration of the detailed description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION OF THE DRAWINGS

Figure 1:
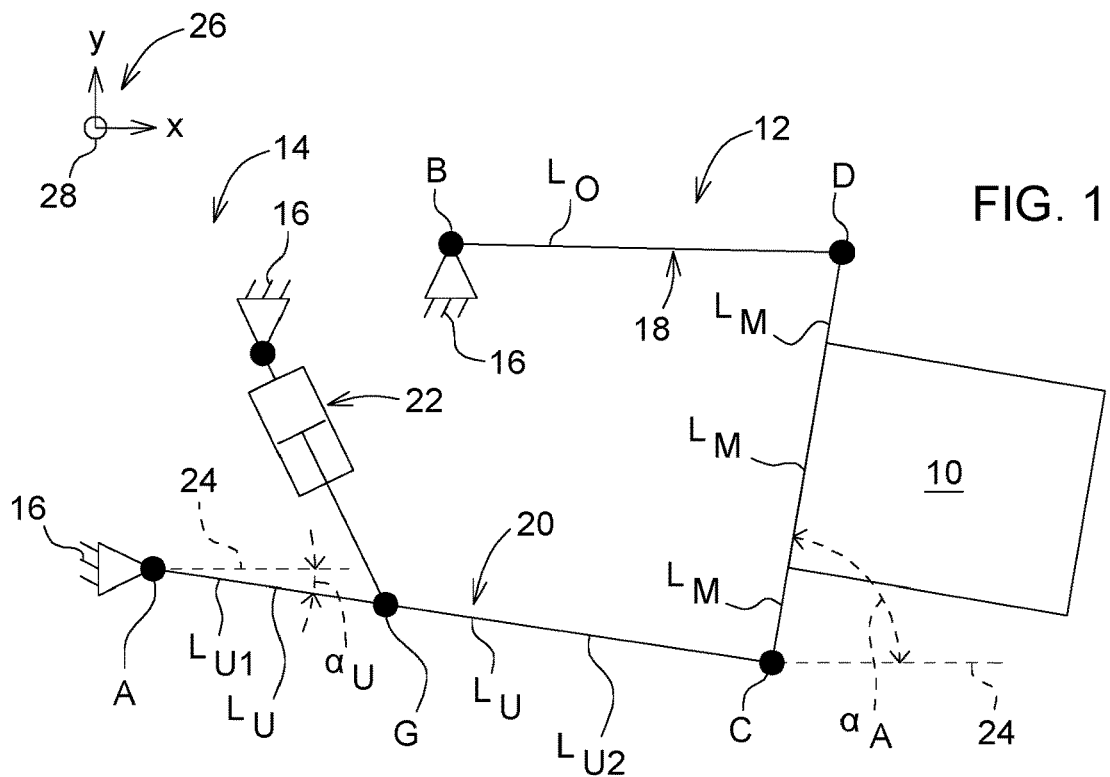
FIG. 1 is a schematic side view of an agricultural implement attached by a front three-point hitch to the front end of a utility vehicle according to an embodiment.

Referring to FIG. 1, an agricultural implement 10, which is attached by a front three-point hitch 12 to an agricultural utility vehicle 14 (e.g., a tractor), is shown. The front three-point hitch 12 in this case is articulated onto a support structure 16 of the utility vehicle 14. In the embodiment of FIG. 1, the utility vehicle 14 is indicated by the support structure 16 for illustration purposes only. The front three-point hitch 12 may comprise an upper link 18 and two parallel lower links 20. The upper link 18 may comprise an articulated connection via an articulation point B (e.g., a first articulation point) to the support structure 16 and via an articulation point D to the agricultural implement 10. Each lower link 20 may comprise an articulated connection via an articulation point A (e.g., a second articulation point) to the support structure 16 and via a second coupling point such as coupling point C to the agricultural implement 10.

In FIG. 1, the total length $L_u$ of the lower link 20 is the sum of the two partial lengths $L_{U1}$ and $L_{U2}$. The partial length $L_{U1}$ extends from the articulation point A up to a link connecting point G of the lower link 20, whereas the partial length $L_{U2}$ extends from the link connecting point G to the coupling point C. A first operative end of a lifting cylinder 22 is connected to the link connecting point G, while a second operative end of the lifting cylinder 22 is connected to the support structure 16.

A desired target orientation angle $\alpha_A$ is enclosed by a vehicle horizontal line 24 and a reference line of the agricultural implement 10, wherein the reference line may be an imaginary extension of a mast height $L_M$ of the agricultural implement 10. In the drawing plane, this reference line forms a connection between the two coupling points C and D on the agricultural implement 10. A lower link angle $\alpha_U$ is enclosed by the lower link 20 and the vehicle horizontal line 24.

For the mathematical/geometrical determination of individual points on the three-point hitch 12, a vehicle-fixed coordinate system 26 may be defined. For example, the vehicle-fixed coordinate system 26 may comprise an x-axis which may be oriented parallel to a longitudinal direction or a travel direction of the utility vehicle 14, and a y-axis which may be oriented parallel to a vertical direction of the utility vehicle 14. The vehicle-fixed coordinate system 26 may be indicated schematically with a point of origin 28, which corresponds to a suitable position on the utility vehicle 14.

Figure 2:
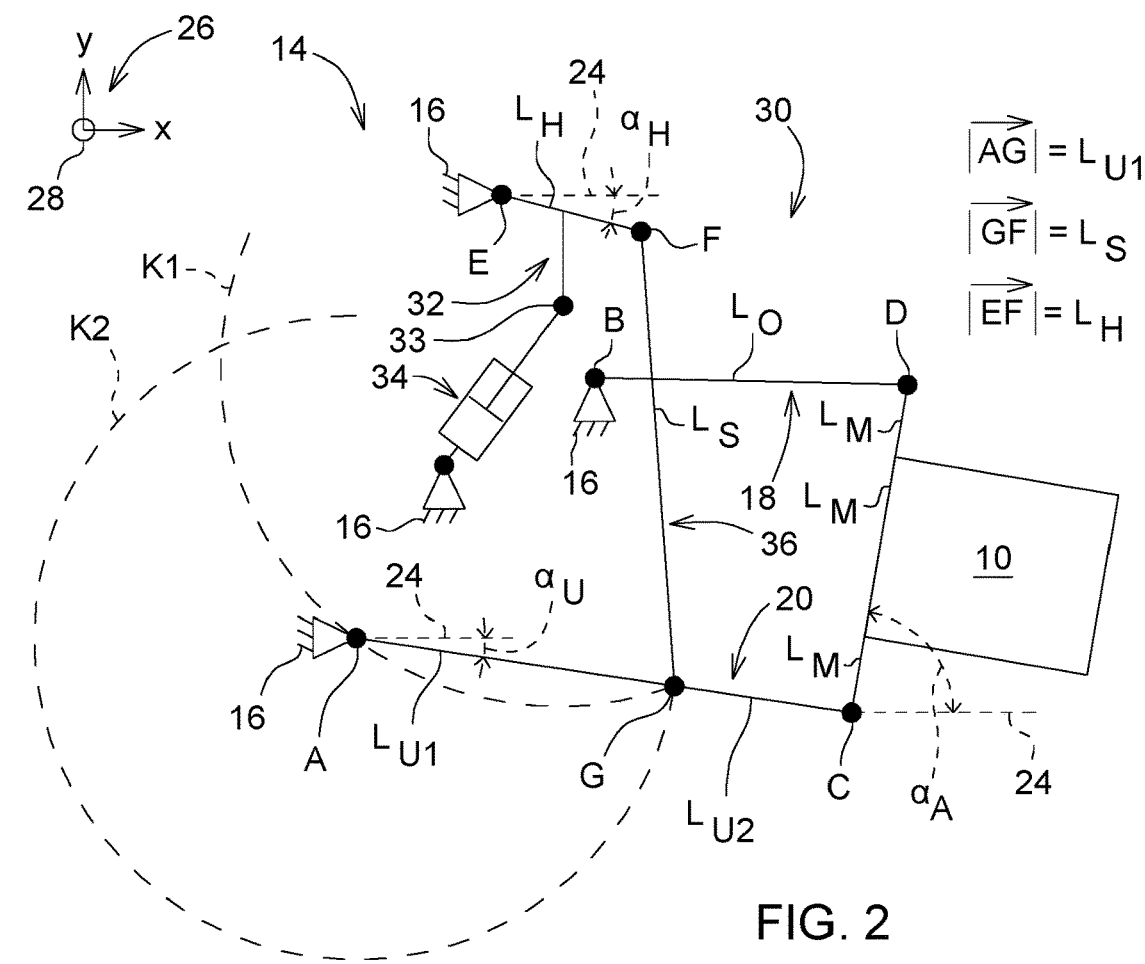
FIG. 2 is a schematic side view of an agricultural implement attached of a rear three-point hitch to the rear end of a utility vehicle according to an embodiment.

In FIG. 2, components that are functionally identical or comparable to those in FIG. 1 are labeled with the same reference symbols and therefore will not be explained again in relation to FIG. 2. FIG. 2 schematically shows an agricultural implement 10, which may be attached by a rear three-point hitch 30 to the agricultural utility vehicle 14. The rear three-point hitch 30 may be articulated onto the support structure 16 of the utility vehicle 14.

The rear three-point hitch 30 may comprise a lift arm 32 with an arm length $L_H$ and three articulation points. The lift arm 32 may be articulated to the support structure 16 at a an articulation point E. An articulation point 33 of the lift arm 32 may be connected to a first operative end of a lifting cylinder unit 34, the second operative end of may be articulated to the support structure 16. An articulation point F of the lift arm 32 may comprise an articulated connection to a lifting element in the form of a length-adjustable lifting spindle 36. The lifting spindle 36 having a variable spindle length $L_S$ may comprise an articulated connection at the first operative end facing away from the articulation point F to the link connecting point G of the lower link 20. A lift arm angle $\alpha_U$ may be enclosed by the arm length $L_H$ of the lift arm 32 and the vehicle horizontal line 24.

In the method for orienting the agricultural implement 10 relative to the vehicle horizontal line 24 or relative to a vehicle vertical line parallel to the y-axis, a user specifies a desired orientation angle $\alpha_A$. This desired orientation angle $\alpha_A$ is to be adjusted, and thus it is an orientation angle $\alpha_A$ (i.e., a target orientation angle). This target orientation angle $\alpha_A$ may be converted by an algorithm yet to be described into the necessary target length $L_O$ of the upper link 18 as a function of the lower link angle $\alpha_U$. The calculated target length $L_O$ may then be automatically adjusted via an actuator on the utility vehicle 14 (for example in the case of a hydraulic upper link 18). In the case of a mechanical upper link 18, the algorithm may be used as an assistance system in order to communicate to a user the necessary target length $L_O$, which may then be manually adjusted by the user.

The target length $L_O$ of the upper link 18 may be calculated mathematically or geometrically as a segment BD. As fixed coordinates relative to the coordinate system 26 and the geometry of the utility vehicle 14, an x-coordinate $B_x$ and a y-coordinate $B_y$ of the articulation point B may be known.

Therefore, an x-coordinate $D_x$ and a y-coordinate $D_y$ of the coupling point D must be determined:

$$D_x = A_x + \cos(\alpha_U) \cdot L_U + \cos(\alpha_A) \cdot L_M, \qquad (1)$$

$$D_y = A_y + \sin(\alpha_U) \cdot L_U + \sin(\alpha_A) \cdot L_M. \qquad (2)$$

In a scalar description, the following holds for the target length $L_O$ according to equation (3):

$$L_O = \sqrt{\begin{array}{l}(A_x + \cos(\alpha_{ij})L_{ij} + \cos(\alpha_A)L_M - B_x)^2 + \\ (A_y + \sin(\alpha_{ij})L_{ij} + \sin(\alpha_A)L_M - B_y)^2\end{array}}.$$

In this equation (3), the x-coordinate $B_x$ and the y-coordinate $B_y$ of the articulation point B are known, as already explained. The same applies to the x-coordinate $A_x$ and the y-coordinate $A_y$ of the articulation point A. If the utility vehicle 14 provides multiple articulation points B, the algorithm must be informed of the arrangement of the upper link 18 relative to the currently used articulation point B, e.g. by the user via an input interface. The length $L_U$ may be known due to the geometry of the lower link 20. The mast height $L_M$ may be unambiguously defined or known. The target articulation angle $\alpha_A$ may be specified by the user, as already explained.

According to equation (3), the calculation of the target length $L_O$ of the upper link 18 may be computed based on a determination of the lower link angle $\alpha_U$. The lower link angle $\alpha_U$ may be detected metrologically by an appropriate sensing system. In the case of a rear three-point hitch 30, the lower link angle $\alpha_U$ may also be determined by first detecting the lift arm angle $\alpha_H$ metrologically by a suitable sensing system, and the lower link angle $\alpha_U$ may then be calculated as a function of the detected lift arm angle $\alpha_H$. Alternatively, the lower link angle $\alpha_U$ may be determined by first detecting the length of the lifting cylinder 34 metrologically by a suitable sensing system, and the lower link angle $\alpha_U$ may then be calculated as a function of the detected length of the lifting cylinder 34. According to FIG. 2, the following holds for the lower link angle $\alpha_U$:

$$\alpha_U = \arctan((G_y - A_y)/(G_x - A_x)). \qquad (4)$$

As fixed coordinates relative to the coordinate system 26 and based on the geometry of the utility vehicle 14, the x-coordinate $A_x$ and the y-coordinate $A_y$ of the articulation point A are known. The x-coordinate $G_x$ and the y-coordinate $G_y$ of the link connecting point G of the lower link 20 may be determined according to the reasoning below:

The point G is calculated as the intersection point of circles K1 and K2.

With regard to K1:

$$(x - F_x)^2 + (y - F_y)^2 = L_S^2. \qquad (5)$$

With regard to K2:

$$(x - A_x)^2 + (y - A_y)^2 = L_H^2. \qquad (6)$$

Therein $F_x$ is the x-coordinate and $F_y$ is the y-coordinate of the third articulation point F of the lift arm 32. For $F_x$ and $F_y$ the following holds:

$$F_x = E_x + \cos(\alpha_H) \cdot L_H, \qquad (7)$$

$$F_y = E_y + \sin(\alpha_H) \cdot L_H. \qquad (8)$$

For the intersection point of the circles K1 and K2 via the chord $c = K1 - K2$ $$G_x = (-c - b \cdot G_y)/a, \qquad (9)$$

wherein
$a = -2F_x + 2A_x$,
$b = -2F_y + 2A_y$,
$c = F_y^2 - A_y^2 + F_x^2 - A_x^2 + L_{U1}^2 - L_S^2$.

Computationally, two intersection points result:

$$G_{y1,2} = (-b_1 \pm (b_1^2 - 4a_1 c_1)^{1/2})/2a_1 \qquad (10)$$

wherein
$a_1 = 1 + (b/a)^2$,
$b_1 = (2cb/a^2) + (2bF_x/a) - 2F_y$,
$c_1 = (c/a)^2 + (2cF_x/a) + F_x^2 + F_y^2 - L_S^2$.

It additionally follows from equation (10) that $a_1 > 0$, $G_{y1,2} \in IR \rightarrow (b_1^2 - 4a_1 c_1)^{1/2} \geq 0 \rightarrow b_1^2 - 4a_1 c_1 \geq 0$, $b_1 < 0$, with which the sought intersection point may be determined according to $$G_y = (-b_1 - (b_1^2 - 4a_1 c_1)^{1/2})/2a_1 \qquad (11)$$

On the basis of the above reasoning, the x-coordinate $G_x$ may be calculated according to equation (9) and the y-coordinate $G_y$ according to equation (11) with the aid of known variables. The lift arm angle $\alpha_H$ is detected metrologically. As fixed coordinates relative to the coordinate system 26 and based on the geometry of the utility vehicle 14, the x-coordinate $E_x$ and the y-coordinate $E_y$ of the articulation point E are known. The length $L_H$ is known from the geometry of the lower link 32. The partial length $L_{U1}$ is either unambiguously determined by the geometry of the lower link 20 or may be modified by the user. The spindle length $L_S$ may be modified by the user. The two latter-mentioned modifiable parameters may be communicated to the algorithm, e.g. by the user via an input interface in the form of a touch sensitive screen.

According to the method for orienting the agricultural implement 10 hitched to the front or rear three-point hitch 12, 30, the target orientation angle $\alpha_A$ of the agricultural implement 10 may be adapted relative to an angle of inclination $\alpha_S$ of the vehicle 14 relative to the earth horizontal line. If one or more deviations occur between the current angle of inclination as of the utility vehicle 14 and a target angle of inclination $\alpha_S^{Ref}$ to be maintained for the relevant agricultural implement 10, this may be compensated by appropriate correction of the target orientation angle $\alpha_A$ of the agricultural implement 10. For this, depending on the direction of the slope, there is an increase or reduction of the target orientation angle $\alpha_A$ for this purpose, corresponding to the difference between the target angle of inclination $\alpha_S^{Ref}$ and the current angle of inclination as, more precisely, for the front three-point hitch 12 corresponding to $$\alpha_A \rightarrow \alpha_A - (\alpha_S - \alpha_S^{Ref})$$

and for the rear three-point hitch 30 corresponding to $$\alpha_A \rightarrow \alpha_A + (\alpha_S - \alpha_S^{Ref})$$

For example, the corresponding computation may be advantageous with implements for carrying liquids in open containers. The current angle of inclination as may be detected by an inclination sensor assigned to the utility vehicle 14.

Without in any way limiting the scope, interpretation, or application of the claims appearing below, a technical effect of one or more of the example embodiments disclosed herein is a method for adjusting an orientation angle of an agricultural implement.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A method for adjusting an orientation angle of an agricultural implement attached to a utility vehicle, the method comprising:

arranging a three-point hitch such that an upper link is coupled to a first articulation point of a support structure of the utility vehicle and to a first coupling point of the agricultural implement and at least one lower link is coupled to a second articulation point of the support structure of the utility vehicle and to a second coupling point of the agricultural implement, the first articulation point of the support structure of the utility vehicle positioned above the second articulation point of the support structure of the utility vehicle;

arranging a lift arm having a first articulation point connected to a third articulation point of the support structure of the utility vehicle, a second articulation point connected to a lifting cylinder connected to a fourth articulation point of the support structure of the utility vehicle, and a third articulation point connected to a length-adjustable lifting spindle connected to the at least one lower link between the second articulation point of the support structure of the utility vehicle and the second coupling point of the agricultural implement, the third articulation point of the support structure of the utility vehicle positioned above the first articulation point of the support structure of the utility vehicle, and the fourth articulation point of the support structure of the utility vehicle positioned below the first articulation point of the support structure of the utility vehicle and above the second articulation point of the support structure of the utility vehicle;

adjusting the orientation angle based on a target length of the upper link, wherein the target length of the upper link is determined as a function of the orientation angle and as a function of a lower link angle; and adjusting the orientation angle corresponding to a difference between a current inclination angle of the utility vehicle on a slope relative to an earth horizontal line as measured by an inclination sensor and a target inclination angle parallel to the earth horizontal line to be maintained for the agricultural implement carrying liquids in an open container to maintain the liquids in the open container, and depending on a direction of the slope, increasing the orientation angle to maintain the target inclination angle parallel to the earth horizontal line when the slope is in a first direction and decreasing the orientation angle to maintain the target inclination angle parallel to the earth horizontal line when the slope is in a second direction opposite the first direction.

2. The method of claim 1, wherein the target length of the upper link is adjusted by an actuator.

3. The method of claim 1, wherein the lower link angle is determined via a sensing system.

4. The method of claim 1, wherein the target length of the upper link is determined as a function of a coordinate of a first articulation point of the upper link relative to a zero point of a defined coordinate system on the utility vehicle.

5. The method of claim 1, wherein the target length of the upper link is determined as a function of a mast height of the agricultural implement.

6. The method of claim 1, wherein the target length of the upper link is determined as a function of a length of the lower link between a second articulation point and a second coupling point.

7. The method of claim 6, wherein the target length of the upper link is determined as a function of a coordinate of the second articulation point of the lower link relative to a zero point of a defined coordinate system on the utility vehicle.

8. The method of claim 1, wherein the orientation angle is enclosed by a vehicle horizontal line and a reference line of the agricultural implement.

9. The method of claim 8, wherein the reference line of the agricultural implement is an imaginary extension of a mast height of the agricultural implement.

10. The method of claim 1, wherein the three-point hitch is a front three-point hitch, and the orientation angle is decreased when the current inclination angle is larger than the target inclination angle to maintain the liquids in the open container of the agricultural implement.

11. The method of claim 1, wherein the three-point hitch is a rear three-point hitch, and the orientation angle is increased when the current inclination angle is larger than the target inclination angle to maintain the liquids in the open container of the agricultural implement.

* * * * *